United States Patent [19]

Yoden

[11] Patent Number: 5,062,904

[45] Date of Patent: Nov. 5, 1991

[54] TREATMENT OF FERROMAGNETIC METAL POWDERS AND MAGNETIC RECORDING MEDIA USING THE SAME

[75] Inventor: Kenichi Yoden, Kanagawa, Japan

[73] Assignee: Fuji Photo Film Co., Ltd., Kanagawa, Japan

[21] Appl. No.: 592,453

[22] Filed: Oct. 2, 1990

[30] Foreign Application Priority Data

Oct. 3, 1989 [JP] Japan ................................. 1-258514

[51] Int. Cl.$^5$ .............................................. H01F 1/02
[52] U.S. Cl. ................................... 148/105; 148/286; 148/287; 219/121.59
[58] Field of Search ................. 148/105, 286, 287; 219/121.59

[56] References Cited

U.S. PATENT DOCUMENTS

| | | | |
|---|---|---|---|
| 4,318,735 | 3/1982 | Mishima et al. | 148/105 |
| 4,420,330 | 12/1983 | Jakusch et al. | 427/127 |
| 4,608,093 | 8/1986 | Umemura et al. | 148/105 |
| 4,909,865 | 3/1990 | Nakagawa et al. | 148/287 |

FOREIGN PATENT DOCUMENTS

| | | | |
|---|---|---|---|
| 62-112702 | 5/1987 | Japan | 148/105 |
| 1-172501 | 7/1989 | Japan | 148/105 |

*Primary Examiner*—John P. Sheehan
*Attorney, Agent, or Firm*—Sughrue, Mion, Zinn, Macpeak & Seas

[57] ABSTRACT

Disclosed are (1) methods for treating ferromagnetic metal powders which comprise synthesizing the ferromagnetic metal powders, and then exposing the ferromagnetic metal powders to plasma in an oxygen atmosphere, and (2) magnetic recording media comprising non-magnetic supports and magnetic layers formed thereon, the magnetic layers being mainly composed of ferromagnetic metal powders and binder resins, in which the ferromagnetic metal powders are treated by the methods described in (1). The ferromagnetic metal powders obtained by the above methods are excellent in oxidation stability, and the magnetic recording media using the above ferromagnetic metal powders are excellent in storage stability.

7 Claims, No Drawings

TREATMENT OF FERROMAGNETIC METAL POWDERS AND MAGNETIC RECORDING MEDIA USING THE SAME

FIELD OF THE INVENTION

The present invention relates to improvements in ferromagnetic metal powders suitable for materials for magnetic recording media for high density recording and magnetic fluids, and more particularly to enhancements in their oxidation stability.

BACKGROUND OF THE INVENTION

Ferromagnetic metal powders mainly composed of Fe and Co are used in the various fields of magnetic recording media, magnetic fluids and the like in which magnetism is utilized, because of their excellent magnetic characteristics.

In particular, with respect to magnetic recording media having a non-magnetic support and a magnetic layer formed thereon and mainly composed of a ferromagnetic powder and a binder resin, the ferromagnetic metal powder is used as the ferromagnetic powder to improve the recording density.

Such magnetic recording media come in practice as audio tapes, video tapes, floppy disks and the like.

The above ferromagnetic metal powders have the problem that they easily react with oxygen and water due to their chemical instability and therefore gradually deteriorate in their magnetic characteristics if placed in an air environment, particularly under the circumstances of high humidity.

In order to improve the chemical stability of the ferromagnetic metal powders, various methods have previously been proposed.

For example, there have been proposed a method of forming layers of protective oxides on the surfaces of the particles of ferromagnetic metal powders as described in JP-A-55-125205 (the term "JP-A" as used herein means an "unexamined published Japanese patent application"), a method of forming protective layers of various organic compounds on the surfaces of the particles of ferromagnetic metal powders as described in JP-A-46-5057, and a method for densifying the structure of the layers of oxides by heat treatment to enhance the protective effect thereof of the layers of the oxides formed on the surfaces of the particles of ferromagnetic metal powders, as described in JP-A-59-273711.

In the above methods, the layers of the oxides are formed on the surfaces of the particles of the metal powders by contact with oxygen under relatively mild conditions, and such methods are referred to as so-called "moderate oxidation".

However, all of the prior-art "moderate oxidation" methods have disadvantages of some kind, so that the satisfactory chemical stability of the ferromagnetic metal powders can not be obtained.

Namely, the so-called "moderate oxidation" methods of forming the layers of the oxides on the surfaces of the particles of the ferromagnetic metal powders have the disadvantage that oxygen atoms gradually diffuse into the particles with time to cause the magnetic characteristics of the ferromagnetic metal powders to deteriorate.

In the methods of forming the protective layers of the organic compounds such as silicones and resins, it is necessary to coat the surface of the particles with relatively large amounts of organic compounds to obtain the protective layers enough to prevent oxygen and water from permeation. Accordingly, there is the problem that the saturation magnetization ($\sigma s$) of the ferromagnetic metal powders is unavoidably reduced.

According to the methods of densifying the above layers of the oxides by heat treatment, if the heat-treating time is too long, oxygen diffuses into the particles and the oxide coatings become thick, which results in the reduced saturation magnetization. Conversely, if the heating time is too short, the oxide coating layers on the surface of the particles can not be sufficiently densified, and therefore the sufficient effect of the stabilization to oxidation can not be obtained. Moreover, it is difficult to control the conditions of the treating procedures and to obtain the stable characteristics.

SUMMARY OF THE INVENTION

It is therefore an object of the present invention to provide a ferromagnetic metal powder excellent in magnetic characteristics and oxidation stability.

Another object of the present invention is to provide a magnetic recording medium excellent in storage durability and suitable for high density recording.

The above objects can be attained by the present invention hereinafter described.

Namely, the present invention provides a method for treating a ferromagnetic metal powder which comprises synthesizing the ferromagnetic metal powder, and then exposing the ferromagnetic metal powder to low temperature plasma in an oxygen atmosphere. The present invention further provides a magnetic recording medium comprising a non-magnetic support and a magnetic layer formed thereon, the magnetic layer being mainly composed of a ferromagnetic metal powder and a binder resin, in which the ferromagnetic metal powder is synthesized, and then treated by exposure to low temperature plasma in an oxygen atmosphere.

DETAILED DESCRIPTION OF THE INVENTION

In the method for treating the ferromagnetic metal powders of the present invention, the ferromagnetic metal powders, which are synthesized by methods such as reduction of metal oxides or reduction of metal salts, are exposed to low temperature plasma in an oxygen atmosphere, whereby the metal elements on the surface of the particles of the ferromagnetic metal powders are oxidized to high crystalline oxides which are high in oxidation number, also uniform in thickness and dense in crystalline structure. Hence, the oxidation stability of the ferromagnetic metal powders can be improved. Further, metal lattice defects in the core portions of the metal particles can be reduced, so that a decrease in coercive force can be restrained. Furthermore, elements such as Si and Al which are used as anti-sintering agents in synthesizing the ferromagnetic metal powders are also oxidized to high crystalline oxides which are high in oxidation number, and therefore the oxidation stability of the ferromagnetic metal powders can be improved. Hence, the ferromagnetic metal powders treated by the method of the present invention have relatively high tolerance to the affects of oxygen and moisture, and therefore the magnetic characteristics thereof are stable and highly unsusceptible to deterioration. Consequently, the magnetic recording media of the present invention in which the ferromagnetic metal powder thus treated is used as a ferromagnetic powder are high in their output and C/N property, and excellent in their storage durability.

In the conventional so-called "moderate oxidation" methods disclosed in JP-A-60-26602, JP-A-60-162708 and U.S. Pat. Nos. 4,318,735 and 4,420,330 in which oxide coatings are formed on the surfaces of the particles of the ferromagnetic metal powders by gradually increasing the partial pressure of oxygen in an atmosphere with heating, or in the methods in which oxide coatings are formed on the surfaces of the particles of the ferromagnetic metal powders by heating in an inert-gas atmosphere, considerable time is required for treatment. In contrast, according to the treating method of the present invention, stable oxide layers sufficient in crystallinity and high in oxidation number are homogeneously formed on the surfaces of the particles of the ferromagnetic metal powders within a very short period of time for the treatment.

The specific reason why the above satutary effects are obtained by exposing the ferromagnetic metal powders to low temperature plasma (oxygen-containing plasma) is not yet totally understood. However, suggested possible explanations are that the reactivity of oxygen with the metal or the oxides low in oxidation number is enhanced, and the reaction is completed within a very short period of time, because oxygen is atomized, and not maintained as oxygen molecules, or that kinetic energy of the gas molecules or atoms in the atmosphere is heightened, which is different from the case of ordinary heating, whereby the movement of the oxygen atoms on the surfaces of the particles of the ferromagnetic metal powders is effected.

In the method of the present invention, the ferromagnetic metal powders are synthesized, for example, by reduction of metal salts or metal oxides or by evaporation of metal under reduced pressure in which the partial pressure of oxygen is low. Then, the resulting ferromagnetic metal powders are treated by exposure to low temperature plasma.

The low temperature plasma may be formed by methods known in the art, for example, by using power supplies such as high frequency, microwave, direct current, alternating current and corona discharge.

In the present invention, the synthesized ferromagnetic metal powders can be exposed to the low temperature plasma, for example, by placing the ferromagnetic metal powders in a Pyrex glass reaction chamber, evacuating the reaction chamber with a rotary pump to a required degree of vacuum, then homogeneously supplying an oxygen-containing gas on the surfaces of the particles of the ferromagnetic metal powders, adjusting the degree of vacuum in the above reaction chamber to about 0.1 to 5 Torr so as to purge residual gases of substancess (e.g., water) adsorbed on the surface of the metal powders and applying a high frequency of about 10 to 50 MHz by application of 10–100 watts of electric power to generate plasma.

At this time, the flow rate of the above oxygen-containing gas is preferably about 1 to 30 cc/minute, more preferably about 5 to 20 cc/minute, per g of the ferromagnetic metal powders. If the flow rate is too high, the saturation magnetization ($\sigma s$) is greatly decreased. If the flow rate is too low, the sufficient effect of the treatment can not be obtained and the objects of the present invention can not be sufficiently attained.

It is desirable that the content of oxygen in the oxygen-containing gas is 0.005 to 100% by volume and preferably 15 to 100% by volume. For example, as the oxygen-containing gas, there can be used a mixed gas of oxygen and nitrogen, argon, helium, krypton or ozone.

The electric power applied in the above low temperature plasma treatment is preferably 10 to 100 watts. and more preferably 10 to 50 watts. If the electric power is lower than 10 watts, the gas temperature is lowered and therefore the sufficient effect of the treatment can not be expected. If the applied electric power is too high, the gas temperature is raised excessively, which results in a reduction in the saturation magnetization ($\sigma s$) of the resulting ferromagnetic metal powder.

The treating time varies depending on the amount of the ferromagnetic metal powder to be treated. However, it is preferred to treat the ferromagnetic metal powder usually within the range of several minutes to 1 hour.

The thus formed oxide layer has a thickness of about 15 to 50 Å and preferably about 15 to 30 Å. The oxide layer formed on the surfaces of the particles of the ferromagnetic metal powders are excellent in oxidation stability even though they are relatively thin coatings. As a results, the magnetic characteristics are significantly less susceptible to deterioration upon exposure to air or moisture.

The ferromagnetic metal powders to be treated by the method of the present invention contain Fe and/or Co in an amount of at least 80 atom %.

Elements other than the above elements may be added to the ferromagnetic metal powders to improve their properties as described in U.S. Pat. No. 3,598,568. For example, the oxidation stability can be further improved by introduction of Ni, Zr, Ti, Al, Si, B, V, Cr, Mn, Cu, Zn, P, Sn or Sb in an amount of about 0.1 to 20 atom % and preferably about 0.2 to 10 atom %.

These ferromagnetic metal powders can be synthesized by the following methods, which are well known in the art.

(1) The method in which an organic acid salt of a ferromagnetic metal is heated to decomposition, followed by reduction with a reducing gas.

(2) The method in which a needle-like iron oxyhydroxide, and preferably containing another type of metal, or a needle-like oxide obtained by heating one of these oxyhydroxides is reduced in a reducing gas.

(3) The method of pyrolyzing a metal carbonyl compound.

(4) The method in which a ferromagnetic metal powder is evaporated in an inert gas under low pressure.

(5) The method for obtaining a ferromagnetic metal powder by reducing a metal salt producible a ferromagnetic metal using a reducing substance (such as a borohydride compound, a hypophosphite or hydrazine) in an aqueous solution of the metal salt.

(6) The method in which a ferromagnetic metal powder is electrically deposited using a mercury cathode, followed by separation from mercury.

The treating method of the present invention can be applied to the ferromagnetic metal powders synthesized by any one of the above methods, for example.

In particular, the method of reducing the metal oxide in the above item (2) or the metal salt in the above item (5) is desirable from the viewpoint of cost.

With respect to the ferromagnetic metal powders treated by the method of the present invention, the effect of the above oxide surface layers becomes even more significant with decreasing size of the ferromagnetic metal particles. However, if the size of the ferromagnetic metal particles becomes too small, the rate of the ferromagnetic metal particles present on the surface layer is increased, which causes a reduction in magnetic characteristics.

It is therefore preferred that the ferromagnetic metal particles of the ferromagnetic metal powders have a specific surface area of at least 35 m$^2$/g, desirably 40 to 80 m$^2$/g, and have a crystallite size of 150 to 250 Å, which is determined by X-ray diffraction analysis. Further, the ferromagnetic metal powders preferably have a coercive force of 1200 to 2000 Oe.

By using the ferromagnetic metal powders treated by the method of the present invention for the magnetic recording media, the desired effect and the feature of the present invention become significant. Namely, since the crystallinity of core portions of the particles is not decreased, the coercive force (Hc) can be prevented from deterioration. Further, the oxide layers formed on the surfaces of the particles have the high stabilization effect, so that the thickness thereof can be reduced without deterioration of the magnetic characteristics. Hence, the magnetic recording media high in output and S/N and excellent in storage durability can be obtained.

In the present invention, the ferromagnetic metal powders may be subjected to the aforesaid moderate oxidation treatment prior to the low temperature plasma treatment as long as the effects of the present invention are not lost, whereby the processing time of the subsequent low temperature plasma treatment can be shortened.

When the ferromagnetic metal powder treated by the method of the present invention is used for the magnetic recording medium, the ferromagnetic metal powder and a binder resin are homogeneously mixed and dispersed by using a kneading machine or a dispersing machine to form a magnetic coating solution. The resulting magnetic coating solution was applied to the surface of a non-magnetic support, followed by drying to form a magnetic layer.

In addition, a lubricating agent, an abrasive material, an antistatic agent and the like are added to the magnetic layer at the same time.

There is no particular restriction on the above materials used for the magnetic recording media of the present invention, and the materials conventionally used for the magnetic recording media are commercially available.

The lubricating agents which can be used for the magnetic recording media of the present invention include various kinds of silicone oils such as polysiloxanes; inorganic powders such as graphite and molybdenum disulfide; plastic fine powders such as a polyethylene powder, a polytetrafluoroethylene powder; higher fatty acids; higher alcohols; higher fatty acid esters and fluorocarbons. Such a lubricating agent is added in an amount of 0.1 to 20 parts by weight per 100 parts by weight of the binder resin.

The abrasive materials include α-alumina, fused alumina, silicon carbide, chromium dioxide ($Cr_2O_3$), corundum and diamond, and they are used as fine powders having an average particle size of 0.05 to 0.5 μm. Such an abrasive material is added in an amount of 0.5 to 20 parts by weight per 100 parts by weight of the binder resin.

As the antistatic agents, there are used conductive powders of graphite, carbon black, carbon black graft polymers and the like, nonionic surface active agents, anionic surface active agents and cationic surface active agents.

As the binder resins used for the magnetic layers in the magnetic recording media of the present invention, there may be used any of known thermoplastic resins thermosetting resins, radiation curable resins, reactive resins and mixtures thereof. It is more preferable that the above binder resins contain components which are crosslinkable or polymerizable by irradiation from a radiation surface.

The thermoplastic resins include acrylic ester-acrylonitrile copolymers, acrylic ester-vinylidene chloride copolymers, acrylic ester-styrene copolymers, methacrylic ester-acrylonitrile copolymers, methacrylic ester-vinylidene chloride copolymers, methacrylic ester-styrene copolymers, vinyl chloride copolymers (details are described hereinafter), polyurethane resins (details are described hereinafter), urethane elastomers, nylon-silicone resins, nitrocellulose-polyamide resins, polyvinyl fluoride, vinylidene chloride-acrylonitrile copolymers, butadiene-acrylonitrile copolymers, polyamide resins, polyvinyl butyral, cellulose derivatives (such as cellulose acetate butyrate, cellulose diacetate, cellulose triacetate, cellulose propionate and nitrocellulose), styrene-butadiene copolymers, polyester resins, chlorovinyl ether-acrylic ester copolymers, amino resins and various thermoplastic synthetic rubbers.

The thermosetting resins or reactive resins described above have a molecular weight of 200,000 or less in the state of coating solutions and are significantly increased in molecular weight by heating after coating and drying. Examples of such resins include phenolic resins, phenoxy resins, epoxy resins, curable-type polyurethane resins, urea resins, melamine resins, alkyd resins, silicone resins, reactive acrylic resins, epoxy-polyamide resins, nitrocellulose-melamine resins, mixtures of high molecular weight polyester resins and isocyanate prepolymers, mixtures of methacrylate copolymers and diisocyanate prepolymers, mixtures of polyester polyols and polyisocyanates, ureaformaldehyde resin, mixtures of low molecular weight glycols, high molecular weight diols and triphenylmethane triisocyanate, polyamine resins and mixtures thereof.

Further, as the radiation curable resins, there can be used resins containing at least one carbon-carbon unsaturated bond in the molecule curable by irradiation. Examples of the radiation curable resins include resins produced by introducing compounds containing at least one carbon-carbon unsaturated bond in their molecule into the above vinyl chloride copolymers or polyurethane resins as comonomers in copolymerization, or by reacting the compounds with the above copolymers or resins. As the compounds containing at least one carbon-carbon unsaturated bond, compounds containing at least one (meth)acryloyl group in their molecule are preferably used. Such compounds may further contain glycidyl groups or hydroxyl groups.

Furthermore, compounds polymerizable by irradiation may be added to the above binder resins. Such compounds include (meth)acrylic esters, (meth)acrylic amides, allyl compounds, vinyl ethers, vinyl esters, vinyl heterocyclic compounds, N-vinyl compounds, styrenic compounds, acrylic acid, methacrylic acid, crotonic compounds, itaconic compounds and olefins. Of these compounds, the particularly preferred compounds include compounds containing at least two (meth)acryloyl groups in one molecule such as diethylene glycol di(meth)acrylate, triethylene glycol di(meth)acrylate, trimethylolpropane tri(meth)acrylate, pentaerythritol tetra(meth)acrylate and reaction products of polyisocyanates and poly(meth)acrylates.

As the above vinyl chloride copolymers, there can be used copolymers having a softening temperature of 150° C. or less and an average molecular weight of about 10,000 to 300,000.

Specific examples of the preferred vinyl chloride copolymers include vinyl chloride-vinyl acetate copolymers, vinyl chloride-vinyl acetate-maleic acid copolymers, vinyl chloride-vinyl acetate-vinyl alcohol copolymers, vinyl chloride-vinyl acetate-maleic acid-vinyl alcohol copolymers, vinyl chloride-vinyl propionate-maleic acid copolymers, vinyl chloride-vinyl propionate-vinyl alcohol copolymers, vinyl chloride-vinyl acetate-acrylic acid copolymers, vinyl chloride-vinyl acetate-acrylic acid-vinyl alcohol copolymers and oxides of these copolymers.

In particular, the vinyl chloride copolymers containing polar groups such as carboxyl groups or salts thereof, sulfonic groups or salts thereof, phosphoric groups or salts thereof, amino groups and hydroxyl groups are preferable for attaining an improvement in dispersibility of the ferromagnetic powders.

As the above polyurethanes, there can be used polyurethanes produced from polyols, diisocyanates and chain extenders as required, by methods known in the art.

The above binders may further contain polyisocyanates compounds having, by definition, at least two isocyanate groups. Examples of such polyisocyanates include isocyanates such as tolylene diisocyanate, 4,4,'-diphenylmethane diisocyanate, hexamethylene diisocyanate, xylylene diisocyanate, naphthylene-1,5-diisocyanate, o-toluidine diisocyanate, isophorone diisocyanate and triphenylmethane triisocyanate; reaction products of the above diisocyanates with polyols; and polyisocyanates formed by condensation of these isocyanates. The above isocyanates are commercially available under the trade names of Coronate L, Coronate HL, Coronate H, Coronate EH, Coronate 2030, Coronate 2031, Coronate 2036, Coronate 3015, Coronate 3041, Coronate 2014, Millionate MR and Millionate MTL, Daltosec 1350, Daltosec 2170 and Daltosec 2280 (manufactured by Nippon Polyurethane Industry Co., Ltd.); Takenate D-102, Takenate D-110N, Takenate D-200 and Takenate D-202 (manufactured by Takeda Chemical Industries, Ltd.); Sumidule N75 (manufactured by Sumitomo Bayer Co., Ltd.); Desmodule L, Desmodule IL. Desmodule N and Desmodule HL (manufactured by Sumitomo Bayer Co., Ltd.); and Barknock D850 and Barknock D802 (manufactured by Dainippon Ink and Chemicals, Inc.).

The compounding ratio of the binder resin to the ferromagnetic metal powder in the magnetic layer of the magnetic recording medium of the present invention is preferably 18 to 30 parts by weight of binder resin per 100 parts by weight of ferromagnetic metal powder.

Solvents for the above coating solutions which can be used in the magnetic recording media of the present invention include organic solvents such as ketones (for example, methyl ethyl ketone and cyclohexanone), alcohols, esters (for example, methyl acetate and butyl acetate), cellosolves, ethers, aromatic solvents (for example, toluene) and chlorinated hydrocarbons (for example, carbon tetrachloride and chloroform).

As materials for the non.-magnetic supports used in the magnetic recording media of the present invention, there can be used synthetic resins (such as polyesters, polyamides, polyolefins and cellulose derivatives), non-magnetic metals, glass, ceramics and paper. They are used in the form of a film, a tape, a sheet, a card, a disk, a drum and the like.

The ferromagnetic metal powders are kneaded with the above lubricating agents, abrasive materials, antistatic agents, solvents and the like (e.g., dispersant) to obtain the coating solutions. In kneading, all of the ferromagnetic metal powder and the components described above are loaded into the kneading machine simultaneously or successively. When they are kneaded and dispersed, various kneading machines are used, which are described in C. Patton, *Point Flow and Pigment Dispersion* published by Jhon Willey & Sons (1964) in detail.

As methods for applying the coating solution to the non-magnetic support to form the magnetic layer, various methods are available. Specifically, the details thereof are described in *Coating Engineering* published by Asakura Shoten (1971).

The magnetic layer thus formed on the non-magnetic support is treated to orientate the ferromagnetic metal particles in the layer, as needed, and then the formed magnetic layer is dried. In order to enhance the magnetic characteristics, the magnetic layer may be subjected to a surface smoothing treatment (a smoothing treatment before drying or a calender treatment after drying).

It is desirable that the thickness of the magnetic layer is 1 to 6 $\mu$m, preferably 2 to 4 $\mu$m.

The ferromagnetic metal powders are synthesized, and then exposed to the low temperature plasma in an oxygen atmosphere, whereby the oxidation stability of the ferromagnetic metal powders can be improved without deterioration of the magnetic characteristics such as the coercive force and the saturation magnetization. The obtained magnetic recording media is excellent in storage durability and can be obtained by using the ferromagnetic metal powders which have been plasma treated according to the present invention.

EXAMPLE 1

Synthesis of Ferromagnetic Metal Powder

An iron oxyhydroxide (containing 2% Ni) powder was suspended in water, and the resulting suspension was alkalified with NaOH. Then, water glass was added to the suspension with stirring to coat the surfaces of particles of the above iron oxyhydroxide powder with Si. After filtration and water washing of the above suspension, the resulting powder cake was dried at 100° C. The powder thus obtained was dehydrated by heating in a stream of nitrogen at 500° C. for 1 hour.

Then, the powder was reduced by heating in a hydrogen gas at 450° C. for 3 hours to obtain a ferromagnetic metal powder.

A nitrogen gas containing dry air in an amount of 1% by volume was introduced to 20 g of the above ferromagnetic metal powder at a constant flow rate of 2,000 cc/min for 5 hours to conduct moderate oxidation, thereby forming an oxide layer on the surface of the particles of the above ferromagnetic metal powder.

Low Temperature Plasma Treatment 20 g of the above ferromagnetic metal powder was loaded into a reaction chamber, and the reaction chamber was evacuated to a degree of vacuum of 1 Torr.

Then, an oxygen gas was introduced into the reaction chamber at a constant flow rate of 15 cc/min per g of the ferromagnetic metal powder, and a high frequency of 13.56 MHz was applied by application of 10 watts of electric power to generate plasma. The above ferromagnetic metal powder was exposed to this plasma for 2 minutes, thus completing the treatment.

EXAMPLE 2

Synthesis of Ferromagnetic Metal Powder

A ferromagnetic metal powder was synthesized in the same manner as in Example 1, and the resulting ferromagnetic metal powder was treated under the following conditions.

The above ferromagnetic metal powder was immersed in toluene, and then dry air was bubbled therethrough to remove toluene to some extent, followed by natural drying in air to remove residual toluene. Thus, oxide layers were formed on the surfaces of the particles.

Low Temperature Plasma Treatment

The ferromagnetic metal powder was treated under the same conditions as with Example 1 with the exception that an electric power of 20 watts was applied.

EXAMPLE 3

Synthesis of Ferromagnetic Metal Powder

An α-FeOOH (containing 5% Ni) powder was suspended in water, and the resulting suspension was alkalified with NaOH. Then, aluminium sulfate was added to the suspension with stirring to coat the surfaces of particles of the above α-FeOOH powder with Al. After filtration and water washing of the above suspension, the resulting powder cake was dried at 100° C. The powder thus obtained was dehydrated by heating in a stream of nitrogen at 500° C. for 1 hour.

Then, the powder was reduced by heating in a hydrogen gas at 430° C. for 3 hours to obtain a ferromagnetic metal powder.

A nitrogen gas containing dry air in an amount of 1% by volume was introduced to 20 g of the above ferromagnetic metal powder at a constant flow rate of 2,000 cc/min for 5 hours to conduct moderate oxidation, thereby forming oxide layers on the surfaces of the particles of the above ferromagnetic metal powder.

Low Temperature Plasma Treatment 20 g of the above ferromagnetic metal powder was loaded into a reaction chamber, and the reaction chamber was evacuated to a degree of vacuum of 1 Torr. Then, an oxygen gas was introduced into the reaction chamber at a constant flow rate of 15 cc/min per g of the ferromagnetic metal powder, and a high frequency of 13.56 MHz was applied by application of 20 watts of electric power to generate plasma. The above ferromagnetic metal powder was exposed to this plasma for 5 minutes, thus completing the treatment.

EXAMPLE 4

Synthesis of Ferromagnetic Metal Powder

Particles of an iron oxyhydroxide powder containing cobalt in an amount of 8 atom % were coated with Al in an amount of 7 atom % similarly with Example 3. Then, the dehydration by heating, the reduction by heating and the modetate oxidation were carried out under the same conditions as with Example 3 to synthesize a ferromagnetic metal powder.

Low Temperature Plasma Treatment

The low temperature plasma treatment was conducted under the same conditions as with Example 3.

COMPARATIVE EXAMPLE 1

A ferromagnetic metal powder was synthesized under the same conditions as with Example 1. Then, a nitrogen gas containing dry air in an amount of 1% by volume was introduced at a constant flow rate of 2,000 cc/min for 5 hours to conduct moderate oxidation, thereby forming an oxide layer on the surface of the particles of the above ferromagnetic metal powder, thus completing the treatment of the ferromagnetic metal powder.

COMPARATIVE EXAMPLE 2

A ferromagnetic metal powder was synthesized under the same conditions as with Example 2. Then, the above ferromagnetic metal powder was immersed in toluene, and thereafter dry air was bubbled therethrough to remove toluene to some extent, followed by natural drying in air to remove residual toluene. Thus, an oxide layer was formed on the surface of the particles, whereby the treatment of the ferromagnetic metal powder was completed.

COMPARATIVE EXAMPLE 3

The ferromagnetic metal powder obtained in Comparative Example 2 was heat treated at 80° C. for 5 minutes while passing dry air at a constant flow rate of 2,000 cc/min.

Evaluation of Storage Stability of Ferromagnetic Metal Powders

For each of the ferromagnetic metal powders obtained as described above, the specific surface area and the saturation magnetization ($\sigma s$) were measured. Further, the saturation magnetization ($\sigma s'$) after standing in the atmosphere of 60° C. and 90% RH for 7 days was also measured to evaluate their storage stability.

The results are shown in Table 1.

TABLE 1

| Ferromagnetic Metal Powder | Specific Surface Area ($m^2/g$) | Saturatium Magnetization ($\sigma s$) emu/g | Saturation Magnetization ($\sigma s'$) emu/g |
|---|---|---|---|
| Example 1 | 52 | 132 | 112 |
| Example 2 | 50 | 129 | 108 |
| Example 3 | 60 | 120 | 110 |
| Example 4 | 52 | 145 | 122 |
| Comparative Example 1 | 54 | 133 | 90 |
| Comparative Example 2 | 53 | 130 | 72 |
| Comparative Example 3 | 50 | 129 | 73 |

Preparation of Magnetic Tapes

Magnetic tapes were prepared using the ferromagnetic metal powders obtained as described above under the following conditions.

Preparation of Magnetic Coating composition

| | Parts by weight |
|---|---|
| Ferromagnetic metal powder obtained above | 100 |
| Vinyl chloride based copolymer (polymerization degree about 300; contents of SO$_3$Na, OH and epoxy groups $7 \times 10^{-5}$, $30 \times 10^{-5}$ and $70 \times 10^{-5}$ eq/g, respectively) | 12 |
| Polyurethane resin (polyester polyurethane; weight average molecular weight 60,000; content of SO$_3$Na group $6 \times 10^{-5}$ eq/g; Tg 20° C.) | 5 |
| α-Al$_2$O$_3$ (average particle size 0.2 μm) | 10 |
| Steanic acid | 1.5 |
| Butyl stearate | 1.5 |
| Methyl ethyl ketone | 300 |
| Cyclohexanone | 50 |

The above composition was dispersed in a sand mill, 6.7 g of a polyisocyanate compound ("Desmodule L-75" produced by Bayer AG; 75% solution) was added to the resulting dispersion which was then mixed with high-speed shering, whereby a magnetic coating composition was prepared.

The coating composition was coated on a 10 μm-thick polyethylene terepthalate film in a dry thickness of 4 μm and subjecting to calendering. Thereafter, the coated film was slit to a width of 8 mm to obtain a magnetic tape.

Evaluation of Storage Durability of Magnetic Tapes

For the magnetic tapes obtained as described above, the saturation magnetic flux density (Bm) was measured. Further, the saturation magnetic flux density (Bm') after standing in the atmosphere of 60° C. and 90% RH for 7 days was also measured. (Bm−Bm')/Bm was used as a measure of their storage stability.

The results are shown in Table 2.

TABLE 2

| Ferromagnetic Metal Powder | Saturation Magnetic Flux Density (Bm) (Gauss) | (Bm—Bm')/Bm |
|---|---|---|
| Example 1 | 3380 | 0.03 |
| Example 2 | 3300 | 0.05 |
| Example 3 | 3070 | 0.03 |
| Example 4 | 3600 | 0.04 |
| Comparative Example 1 | 3370 | 0.13 |
| Comparative Example 2 | 3350 | 0.15 |
| Comparative Example 3 | 3300 | 0.15 |

While the invention has been described in detail and with reference to specific embodiments thereof, it will be apparent to one skilled in the art that various changes and modifications can be made therein without departing from the spirit scope thereof.

What is claimed is:

1. A method for treating a ferromagnetic metal powder which comprises forming ferromagnetic metal powder, and then exposing said ferromagnetic metal powder to a low temperature plasma in an oxygen atmosphere.

2. A method as in claim 1, wherein said ferromagnetic metal powder is formed by reducing a metal oxide in a reducing gas or by reducing a metal salt in a reducing solution.

3. A method as in claim 1, which comprises forming ferromagnetic metal powder, gradually oxidizing a surface of the ferromagnetic metal powder, and then exposing said ferromagnetic metal powder to a low temperature plasma in an oxygen atmosphere.

4. A method as in claim 3, wherein said ferromagnetic metal powder was obtained by reducing a metal oxide in a reducing gas or by reducing a metal salt in a reducing solution.

5. A method as in claim 1, wherein plasma exposure of the ferromagnetic metal powder is performed by placing the ferromagnetic metal powder in a reaction chamber, evacuating the reaction chamber with a rotary pump to a required degree of vacuum, then supplying an oxygen-containing gas onto surfaces of particles of the ferromagnetic metal powder, then adjusting the degree of vacuum in said reaction chamber to about 0.1 to 5 Torr, and applying a high frequency of about 10 to 50 MHz by application of 10 to 100 watts of electric power to generate plasma.

6. A method as in claim 5, wherein said oxygen-containing gas is supplied to the reaction chamber at a flow rate of about 1 to 30 cc/minute per g of the ferromagnetic metal powder.

7. A method as in claim 1, wherein said ferromagnetic metal powder has a specific surface area of at least 35 m$^2$/g and a crystallite size of 150 to 250 Å.

* * * * *